Aug. 10, 1943.  W. E. JOHNSTON  2,326,657
CAMERA MOUNTING
Filed March 3, 1941  3 Sheets-Sheet 1
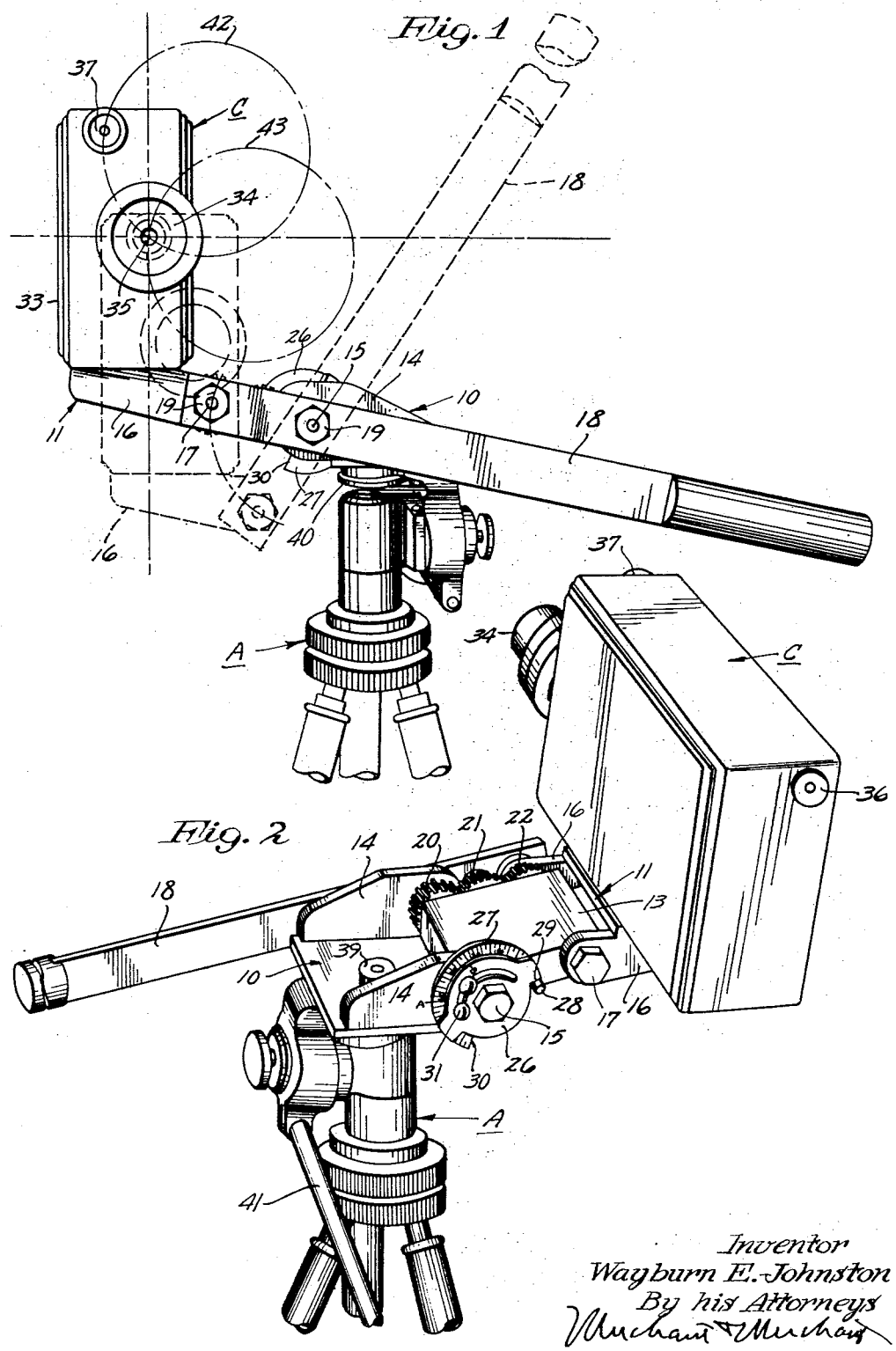
Inventor
Wayburn E. Johnston
By his Attorneys Aug. 10, 1943.  W. E. JOHNSTON  2,326,657
CAMERA MOUNTING
Filed March 3, 1941  3 Sheets-Sheet 2
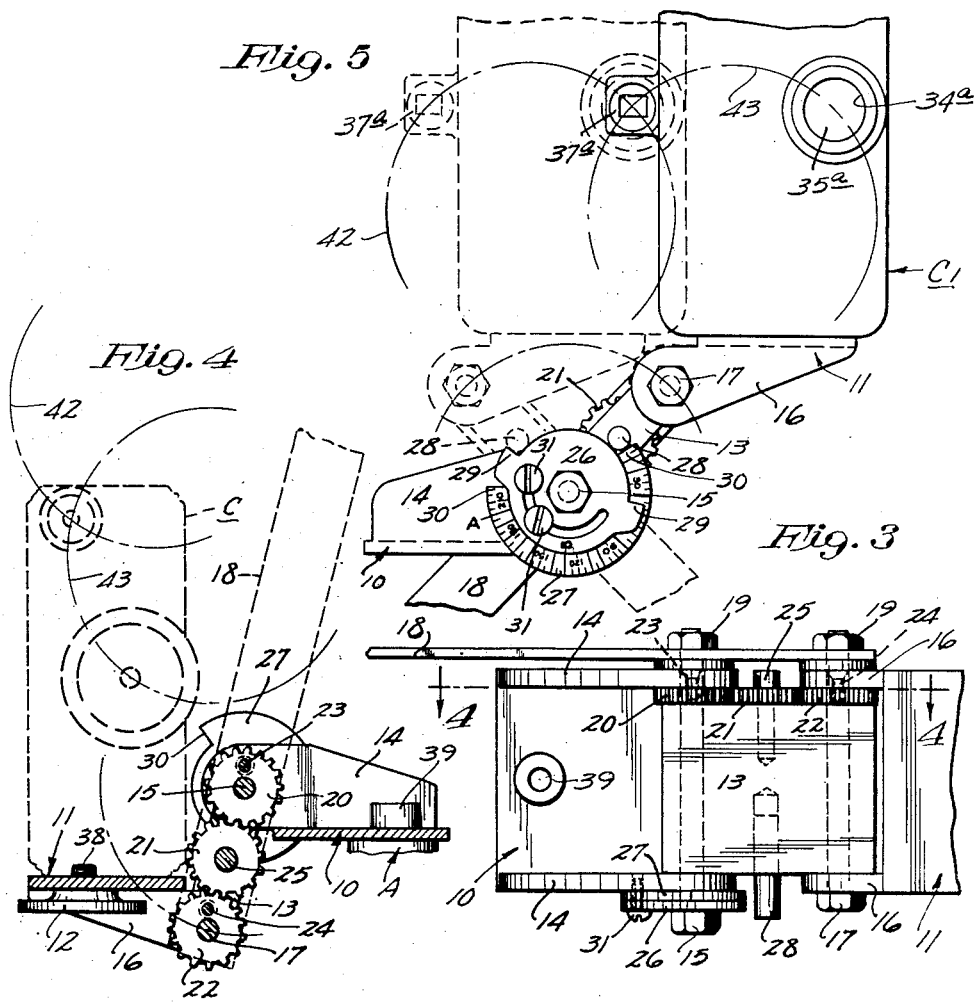
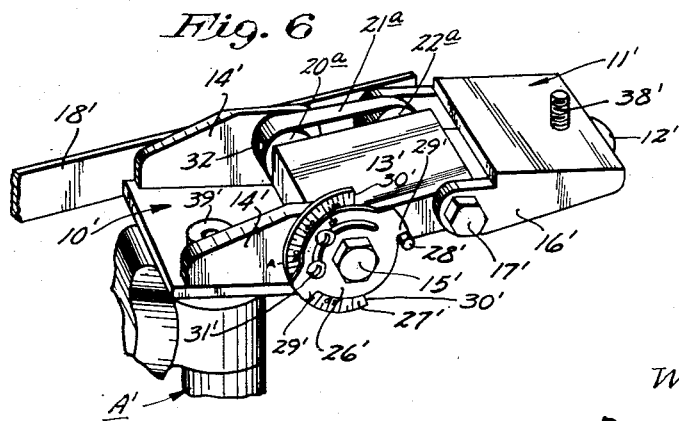
Inventor
Wayburn E. Johnston
By his Attorneys Aug. 10, 1943.　　　W. E. JOHNSTON　　　2,326,657
CAMERA MOUNTING
Filed March 3, 1941　　　3 Sheets-Sheet 3
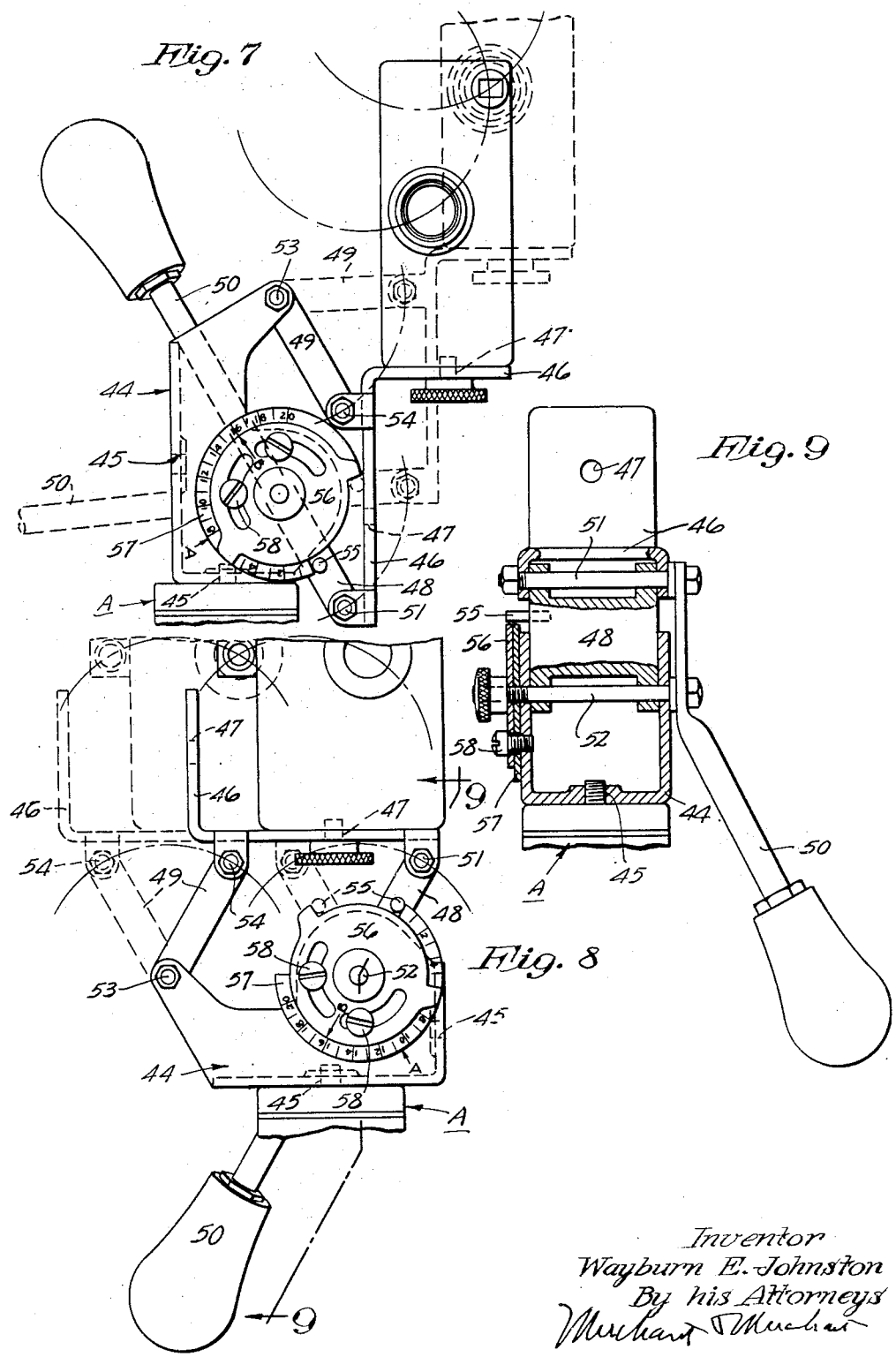
Inventor
Wayburn E. Johnston
By his Attorneys Patented Aug. 10, 1943

2,326,657

UNITED STATES PATENT OFFICE 2,326,657

CAMERA MOUNTING

Wayburn E. Johnston, Minneapolis, Minn.

Application March 3, 1941, Serial No. 381,448

5 Claims. (Cl. 95—86)

My present invention relates to improved methods of and apparatus for correction for parallax in cameras having view finders with their axes parallel to but radially or laterally offset from the axes of the photographic apertures thereof. In a more specific sense my present invention relates to improvements in methods of and apparatus for mounting cameras of the type described in such a manner that the parallax or error between the field of view of the photographic aperture and the field of view of the offset view finder may be quickly and easily compensated for.

While prior hereto numerous so-called parallax correcting devices have appeared for compensating for or otherwise overcoming or eliminating the error caused by the offset relations of view finders to the photographic axes of cameras in connection with particular cameras for which they were specifically designed, there appears to have been a long felt need prior hereto for an entirely new method of and means for correcting for parallax whereby a single parallax correcting device could be used more or less universally in connection with and for correcting or eliminating parallax troubles in connection with cameras having view finders offset different radial distances from and in different directions from their photographic axes. The adverse effects of this parallax condition caused by the offset relation between a view finder of a camera and the camera's photographic axis, while not usually of great importance when operating the camera at great distances from the subject, increase sharply as the distance between the subject and camera is reduced and becomes very serious as the distance is reduced below fifteen or twenty feet. For example, when taking portraits of people at close range, it is not uncommon for an operator to frame or compose the subject's head and shoulders or possibly the entire subject in the view finder prior to or during the exposure period only to discover upon development of the film that a large part of the subject's head or shoulder is missing from the developed film as a result of the offset relation between the fields of view of the camera's photographic aperture and view finder. This invention, however, provides new and improved methods and mechanisms for quickly and positively eliminating this parallax condition and all errors caused by offset relations between view finders and the photographic apertures of the cameras.

Of the several forms of apparatus herein shown for carrying out the improved method hereto, each is in the nature of a carriage-acting camera mounting device adapted to be interposed between a camera and a fixed support such as a tripod. These forms of the apparatus are adapted by simple manipulation to shift the camera bodily to bring the camera aperture into the position occupied by the view finder for the composing period and then returning the camera aperture to its normal position for the exposure period. As an important feaure of the invention, these camera carriages or mounting devices are universal in nature in that they can be employed with equal efficiency in connection with different cameras having view finders offset different distances from their photographic axes and offset in different directions from their photographic axes.

The above and other highly important objects and advantages of the invention will be made apparent from the following specification, claims and appended drawings. In the accompanying drawings like characters indicate like parts throughout the several views.

Referring to the drawings:

Fig. 1 is a view in front side elevation of one form of my improved camera mounting showing the same as it appears under operating conditions mounted on a suitable base of support and having a camera in operative position thereon;

Fig. 2 is a rear perspective view of the organization of elements shown in Fig. 1;

Fig. 3 is a fragmentary top plan view of the camera mounting device of Figs. 1 and 2 with some parts broken away;

Fig. 4 is a detail sectional view taken on the line 4—4 of Fig. 3 and rotated 180° on a vertical axis, some parts which are broken away in Fig. 3 being shown in Fig. 4 and some parts beyond the section line 4—4 of Fig. 3 being represented by dotted lines in Fig. 4;

Fig. 5 is a fragmentary view in rear elevation of the form of camera mounting shown in Figs. 1 to 4 inclusive but having a different camera mounted thereon and its stops adjusted to adapt the mounting to the different camera;

Fig. 6 is a rear perspective view similar to Fig. 2 but illustrating a slightly modified form of the invention;

Fig. 7 is a view substantially corresponding to Fig. 1 but showing still another form of the invention;

Fig. 8 is a view in front elevation of the camera mounting of Fig. 7 but showing the same rotated 90° in a counterclockwise direction with respect to Fig. 7 to accommodate a camera wherein the direction of spacing between the view finder and camera aperture is in a different direction than in Fig. 7; and Fig. 9 is a detailed sectional view taken on the irregular line 9—9 of Fig. 8.

Description of Figs. 1 to 5 inclusive

The carriage-acting camera mounting of these Figs. 1 to 5 inclusive comprises mainly a relatively fixed mounting element 10 that is adapted to be mounted on and rigidly anchored to a suitable base of support such as a conventional photographic tripod A, a shiftable camera supporting element in the nature of a platform 11 that is adapted to have a camera mounted thereon and anchored thereto by means of an anchoring screw or the like 12, and a rigid link-acting element 13 pivotally anchored at one end portion to the relatively fixed mounting element 10 and at its other end to the shiftable camera mounting or supporting element 11. The fixed mounting element 10 is provided with upstanding laterally spaced parallel flanges 14 to which the link 13 is pivotally anchored by means of a suitable bolt or the like 15 passed freely through the opposed flanges 14 and the link 13. The shiftable camera mounting element 11, which has a camera engaging top surface, is provided with downwardly extending laterally spaced parallel flanges 16 that are anchored to the free end portion of the link 13 by a bolt or the like 17 passed freely through the flanges 16, and link 13. For the purpose of rotating the link 13 about the fixed axis 15, there is provided an operating lever 18 that receives the projected ends of pivot bolts 15 and 17. By reference to Figs. 1 and 3 particularly it will be seen that the pivot bolts 15 and 17 pass through the lever 18 and that the lever 18 is anchored against displacement by means of nuts 19 applied to the said bolts outwardly of the lever 18.

For the purpose of maintaining a constant or parallel relation between the fixed anchoring element 10 and the shelf-like shiftable camera mounting element 11 throughout all pivotal movements of the link 13 about its axis 15, there is provided in Figs. 1 to 5 a train of gears 20, 21 and 22. The gear 20 is mounted loose on the pivot shaft or bolt 15 immediately adjacent the inside of one of the flanges 14 of element 10 and is anchored to that flange by means of an anchoring pin 23. The gear 22, on the other hand, is mounted on the pivot bolt or shaft 17 intermediate the free end portion of the link 13 and flange 16 of element 11 and is anchored against rotation with respect to the said flange of element 11 by means of an anchoring pin 24. Gear 21 is an idler and meshes with gears 20 and 22. This idle gear 21 is loosely mounted on a stub shaft 25 that is anchored in and projects laterally from the intermediate portion of the link 13, see particularly Fig. 3. Of course, to accomplish the end in view, the ratio between gears 20 and 22 should be one to one.

For limiting the extent of pivotal movements of the mechanism about the axis 15 to arcs of desired length and for determining the location of such arcs of movement within the possible much greater arc of movement, I provide adjustable stop devices 26 and 27 and a cooperating stop pin 28. The stop pin 28 is rigidly carried by and projects from the intermediate portion of link 13 in radially offset relation to the fixed axis 15. The stop elements 26 and 27 are in the nature of flat disc-like elements rotatively mounted in superimposed relation upon the axis 15. The stop discs 26 and 27 are respectively provided with radially projecting stop surfaces 29 and 30 between which the stop pin 28 operates and with opposite of which the pin 28 becomes engaged at opposite extremes of its movement. The discs 26 and 27 are normally anchored against rotation one in respect to the other and in respect to the fixed mounting element 10 by means of suitable headed lock screws 31 passed through aligned arcuate slots in the discs 26 and 27 and have screw-threaded engagement with an adjacent flange 14 of the fixed element 10. When the stop discs 26 and 27 are relieved of clamping pressure by the screws 31, they are free to be rotated bodily as a unit so as to bodily shift the arcuate path of travel of pin 28 to various different rotary positions about the axis 15 and, in addition, each disc is free for independent movement so as to vary spacing between stop surfaces 28 and 29 to thereby vary the length of arcuate movements of the pin 28.

Description of Fig. 6

The device of Fig. 6 is substantially identical to the device of Figs. 1 to 5 inclusive in all respects with the exception of the specific form of drive between elements 10 and 11, which in Figs. 1 to 5, inclusive, is provided by a train of gears, and in Fig. 6 is provided by pulleys and a belt, and, therefore, all parts in Fig. 6, like those in Figs. 1 to 5 inclusive, will be assigned like characters plus the prime mark, and a detailed description will be omitted. As a substitute for the gear drive of Figs. 1 to 5 inclusive, the form of the invention of Fig. 6 utilizes sheaves 20a and 22a and a coupling belt 21a. The sheave 20a is mounted in exactly the same manner as gear 20 of Figs. 1 to 5 inclusive, and the sheave 22a is mounted in exactly the same manner as gear 22 of Figs. 1 to 5 inclusive. The belt 21a, which is preferably of flexible metal such as copper or spring bronze, is shown as being anchored against rotation with respect to the sheaves 20a and 22a by suitable anchoring screws, or the like, 32. This form of the invention will operate in exactly the same manner as the structure of Figs. 1 to 5 inclusive except that the extent of pivotal movements of the link 13' will be somewhat more limited by reason of the anchoring screws.

The camera, indicated as an entirety in Figs. 1 and 2 by C, is of the moving picture variety and includes a camera case 33 provided at its front end with a photographic aperture 34, which aperture is provided with the customary lens 35. The view finder of this camera C is of the so-called optical type and includes a small rear lens 36 and a front lens 37. The lenses of the view finder are radially offset from the axis of the photographic aperture 34, but the axis of the view finder is parallel to the axis of the photographic aperture. For the purpose of illustration, all other parts of the camera exposed at the outside of the casing have been omitted, but it may be assumed that the camera is conventional in form. For anchoring the flat bottom of the camera to the flat platform-like top of the camera mounting element 11, there is provided a thumb screw 38 that is journalled in the flat top of element 11 and is adapted to be screwed into a screw-threaded recess in the bottom of the camera provided for the purpose of anchoring the camera to a suitable base of support usually a tripod. The fixed mounting element 10 is shown in Figs. 1 and 2 as being mounted on the tripod A and for this purpose the element 10 is provided with an internally threaded boss 39 for reception of an anchoring screw forming part of the tripod, the head of such screw being indicated by 40 in Fig. 1. Pivotal adjusting movements of the camera mounting and camera about a vertical axis concentric with the boss 39 and forward and rearward tilting of the entire mounting device and camera may be accomplished in the head of the tripod A through manipulation of an operating handle 41. This particular tripod and its head do not, however, form any part of the present invention, and it should be understood that various different tripods or fixed supporting mediums may be employed.

In Fig. 5 a different camera is shown as mounted upon the device and the mounting device itself adjusted to operate in connection with this different camera. The only difference between this camera of Fig. 5 and the camera of Figs. 1 and 2 is the different extent of spacing and direction of spacing of the view finder from the photographic aperture of the camera. The camera case of Fig. 5 is indicated by C1, the photographic aperture thereof by 34a, the photographic lens by 35a and the front view finder lens or aperture by 37a.

*Operation of Figs. 1 to 6 inclusive*

After the particular camera such as the one illustrated at C has been mounted upon the carriage-acting mounting device as shown and the said carriage-acting mounting device has been suitably mounted on a base of support, as shown, for example, the mounting device can readily be adapted to the particular camera selected by proper adjustment of the stop discs 26 and 27 with respect to the stop pin 28, so we may assume that the screws 31 will initially be loosened so as to leave the device for full range pivotal action. Now it is important to note that when the operating lever is moved pivotally to any extent within maximum range of the device, the camera is moved bodily about an arcuate path and without changing the direction of the optical axis of the camera; and that under such arcuate movements of the camera, the axis of the view finder and the axis of the photographic aperture of the camera move through or describe arcs of eccentric but intersecting circles. In Fig. 1 a circle through part of which the axis of the view finder may be made to travel is indicated by broken lines at 42; and the circle through a portion of which the photographic axis of the camera may be made to travel is indicated by broken lines at 43. Of course, it will be understood that the maximum range of action of this device will not permit movement through a full 360° but is, in fact, limited to something over 250°. In practice, therefore, the arcs of possible travel of the axes of the view finder and photographic aperture will intersect at only one point.

Of course, the object in view is the moving or shifting by means of this device the camera from a normal picture-taking position to a position wherein the axis of the view finder is shifted to a position normally occupied by the photographic axis of the camera for the viewing or composing period and then shifting the camera back to its normal picture-taking position wherein the axis of the photographic aperture is not only back to its normal position but back to the exact position occupied by the axis of the view finder during the composing period. Of course, for any given camera, the lengths of the arcuate paths of travel of the axes of the photographic aperture and view finder will be determined by the actual spacing of the view finder axis from the photographic axis, and this will in turn determine the circumferential spacing of stop surfaces 29 and 30; and for any given camera the actual locations of these arcs of travel of the axis of the view finder and the axis of the photographic aperture will be determined by the direction of spacing between the axis of the view finder and the axis of the photographic aperture, and the stop discs 26 and 27 will be rotated bodily to properly position the limits of such paths of movement. In adapting the device for any camera, however, regardless of the extent of offset between the view finder and photographic aperture and regardless of the direction of the view finder from the photographic aperture, one of the stop surfaces 29 or 30 will be set to engage the stop pin 28 at a point whereat the axis of the photographic aperture is at the point of intersection of the circles 42 and 43, and the other of said stop surfaces 29 or 30 will be set to engage the pin 28 when the axis of the view finder is at the point of intersection of the circles 42 and 43. When the stop discs 26 and 27 are thusly positioned, the lock screws 31 will be tightened and the limits of movement will be properly established for the particular camera in question and this regardless of the direction or extent of spacing between the view finder and photographic aperture. For the purpose of permitting quick establishment of stop positions for different makes of cameras by direction, probably furnished by the manufacturer of the device, the stop disc 27 is provided with a calibrated scale which may be used in conjunction with index marks A and B, the former on the flange 14 of fixed element 10 and the latter on the stop disc 26.

By reference to Fig. 5 it will be seen that the direction of spacing between the axis of the view finder and photographic aperture is in a horizontal direction and that the arcuate paths of travel of these axes are between horizontally spaced points on the eccentric but intersecting circles 42 and 43. Also it will be noted by reference to Fig. 5 that the lengths of the arcuate paths of travel of the axes of the view finder and photographic aperture are not only through different segments of the circles 42 and 43 than in Figs. 1 to 4 inclusive, but are considerably longer due to the greater spacing between the said axes.

It is believed that the improved method hereof has been made clear by the foregoing operation of the mechanism.

*Description of Figs. 7, 8 and 9*

The carriage-acting camera mounting of Figs. 7, 8 and 9 comprises a fixed mounting base 44 that is adapted to be mounted on a fixed base of support such as a tripod A. For a purpose that will hereinafter be made apparent, the mounting base or member 44 is provided with flat mounting surfaces disposed at 90° angles one in respect to the other and each of which is provided with an anchoring screw-receiving aperture 45. Spaced from the relatively fixed element 44 is a camera supporting element 46 having two flat platform-like camera engaging surfaces disposed at 90° angles one in respect to the other and each provided with an anchoring screw-receiving aperture 47. The camera mounting element 46 is anchored to the relatively fixed mounting base 44 by rigid parallel links 48 and 49, each of which is pivotally anchored at one end to the base 44 and at its other end to the mounting element 46. For shifting the camera mounting element 46, there is provided a handle-equipped operating lever 50 that is journalled on the extended ends of anchoring bolts 51 and 52 which pivotally anchor opposite ends of the rigid link 48. Opposite ends of rigid link 49 are pivotally anchored one to the base element 44 by a bolt 53, and the other end to the camera mounting element 46 by a bolt 54. For the purpose of limiting arcuate movements of the camera mounting element 46, the link 48 is provided with a stop pin 55 that works between circumferentially spaced stop surfaces one on a stop disc 56 and the other on a concentrically disposed stop disc 57. The stop discs 56 and 57 operate in exactly the same manner as do the stop discs 26 and 27 of Figs. 1 to 6 inclusive and are locked in rotatively adjusted position by lock screws 58 that work in segmental slots in the discs 56 and 57 and have screw-threaded engagement with the underlying flat surface of the fixed mounting base 44.

The camera of Fig. 7, being substantially identical to the camera of the other figures previously described except for the relative location of its view finder with respect to its photographic aperture, is believed to be sufficiently clear and to require no special comment.

The camera mounting device of Figs. 7 to 9 inclusive functions substantially the same as the mounting devices of other figures previously described, but due to its construction, is more limited in the extent of shifting movements, and it is for this reason that the device of these latter figures is provided with two angularly disposed places for attachment to a tripod or other support and is provided with two angularly disposed surfaces on which to place the camera. When using this device, if the direction of spacing between the view finder and photographic aperture is more nearly in a vertical plane than in a horizontal plane, the camera is mounted, as shown in Fig. 7, so that the main movement will be in a vertical direction; but if a camera is employed wherein the direction of spacing between the view finder and photograhic aperture is more nearly in a horizontal plane than a vertical plane, then the mounting device is rotated 90° and used as shown in Figs. 8 and 9 wherein it will be seen that the major shifting movement is in a substantially horizontal plane.

What I claim is:

1. The combination with a camera having a photographic aperture and a view finder in laterally offset relation to the optical axis of the camera, of a camera carriage comprising a relatively fixed mounting element, a link-acting element pivotally anchored to the relatively fixed mounting element, a camera supporting element pivotally anchored to the link-acting element in spaced relation to the first mentioned pivot and having the said camera anchored thereto, means for maintaining a predetermined angular relation between the camera supporting element and the said relatively fixed mounting element under pivotal movements of the link-acting element, whereby under pivotal movements of the link-acting element the optical center of the view finder and the photographic axis of the camera will travel through arcs of eccentric but intersecting circles, and stop means positioned to limit pivotal movements of the link-acting elements between two extreme positions so disposed that positions of the optical center of the view finder and of the photographic axis of the camera are interchanged at one of said extreme positions.

2. The combination with a camera having a photographic aperture and a view finder in laterally offset relation to the optical axis of the camera, of a camera carriage comprising a relatively fixed mounting element, a link-acting element pivotally anchored to the relatively fixed mounting element, a camera supporting element pivotally anchored to the link-acting element in spaced relation to the first mentioned pivot and having the said camera anchored thereto, means for maintaining a pre-determined angular relation between the camera supporting element and the said relatively fixed mounting element under pivotal movements of the link-acting element, whereby under pivotal movements of the link-acting element the optical center of the view finder and the photographic axis of the camera will travel through arcs of eccentric but intersecting circles, and stop means positioned to limit pivotal movements of the link-acting elements in one direction to an extreme position wherein the optical center of the view finder is at a point of intersection of the said eccentric circles, and stop means positioned to limit said pivotal movements in the other direction to a position wherein the photographic axis of the camera is at the said point of intersection of the said eccentric circles.

3. The combination with a camera having a photographic aperture and a view finder in laterally offset relation to the optical axis of the camera, of a camera carriage comprising a relatively fixed mounting element, a link-acting element pivotally anchored to the relatively fixed mounting element, a camera supporting element pivotally anchored to the link-acting element in spaced relation to the first mentioned pivot and having the said camera anchored thereto, means for maintaining a predetermined angular relation between the camera supporting element and the said relatively fixed mounting element under pivotal movements of the link-acting element, whereby under pivotal movements of the link-acting element the optical center of the view finder and the photographic axis of the camera will travel through arcs of eccentric but intersecting circles, and stop means positioned to limit pivotal movements of the link-acting elements in one direction to an extreme position wherein the optical center of the view finder is at a point of intersection of the said eccentric circles, and stop means positioned to limit said pivotal movements in the other direction to a position wherein the photographic axis of the camera is at the said point of intersection of the said eccentric circles, said stop means being adjustable to vary the lengths of the arcs of travel of the optical center of the view finder and the optical axis of the camera.

4. The combination with a camera having a photographic aperture and a view finder in laterally offset relation to the optical axis of the camera, of a camera carriage comprising a relatively fixed mounting element, a link-acting element pivotally anchored to the relatively fixed mounting element, a camera supporting element pivotally anchored to the link-acting element in spaced relation to the first mentioned pivot and having the said camera anchored thereto, means for maintaining a predetermined angular relation between the camera supporting element and the said relatively fixed mounting element under pivotal movements of the link-acting element, whereby under pivotal movements of the link-acting element the optical center of the view finder and the photographic axis of the camera will travel through arcs of eccentric but intersecting circles, and stop means positioned to limit pivotal movements of the link-acting elements in one direction to an extreme position wherein the optical center of the view finder is at a point of intersection of the said eccentric circles, and stop means positioned to limit said pivotal movements in the other direction to a position wherein the photographic axis of the camera is at the said point of intersection of the said eccentric circles, said stop means being adjustable to vary the lengths of the arcs of travel of the optical center of the view finder and the optical axis of the camera, said stop means also being adjustable to vary the angular locations of the said arcs of travel with respect to radial lines drawn from the axes of said arcs.

5. The combination with a camera having a photographic aperture and a view finder in laterally offset relation to the optical axis of the camera, of a camera carriage comprising a relatively fixed mounting element, a link-acting element pivotally anchored to the relatively fixed mounting element, a camera supporting element pivotally anchored to the link-acting element in spaced relation to the first mentioned pivot and having the said camera anchored thereto, means for maintaining a predetermined angular relation between the camera supporting element and the said relatively fixed mounting element under pivotal movements of the link-acting element, whereby under pivotal movements of the link-acting element the optical center of the view finder and the photographic axis of the camera will travel through arcs of eccentric but intersecting circles, and stop means positioned to limit pivotal movements of the link-acting elements between two extreme positions so disposed that positions of the optical center of the view finder and of the photographic axis of the camera are interchanged at one of said extreme positions, said stop means including a pair of concentric discs anchored to one of said elements in concentrically disposed relation to one of said pivots, each of said discs being provided with a stop surface and being rotatively adjustable one in respect to the other to vary the circumferentially spacing of the stop surfaces of the opposite discs, means for locking the said discs together in adjusted position, and a cooperating stop carried by another of said elements and operative between the stop surfaces of the discs.

WAYBURN E. JOHNSTON.